United States Patent [19]
Dix et al.

[11] Patent Number: 5,015,754
[45] Date of Patent: May 14, 1991

[54] QUATERNIZED CONDENSATION PRODUCTS OF TRIALKANOLAMINES

[75] Inventors: Johannes P. Dix, Neuhofen; Rolf Fikentscher; Ingrid Steenken-Richter, both of Ludwigshafen, all of Fed. Rep. of Germany

[73] Assignee: BASF Aktiengesellschaft, Ludwigshafen, Fed. Rep. of Germany

[21] Appl. No.: 396,128

[22] Filed: Aug. 21, 1989

[30] Foreign Application Priority Data

Sep. 3, 1988 [DE] Fed. Rep. of Germany ....... 3829974

[51] Int. Cl.$^5$ .................. C08G 65/32; A61K 31/435; D06M 13/46
[52] U.S. Cl. ..................................... 558/260; 560/164; 560/263; 564/32; 564/282; 564/286; 564/290; 564/292; 564/294; 564/295
[58] Field of Search ............... 564/282, 286, 290, 292, 564/294, 295, 32; 558/260; 560/164, 263

[56] References Cited

U.S. PATENT DOCUMENTS 4,057,554 11/1977 Redmore et al. ............... 564/286 X
4,778,813 10/1988 Fenyes et al. .................. 564/286 X

FOREIGN PATENT DOCUMENTS 0087147 8/1983 European Pat. Off. ............ 564/63
0223064 5/1987 European Pat. Off. ........... 534/637
3526101 1/1987 Fed. Rep. of Germany ......... 5/634

OTHER PUBLICATIONS

Bulanda et al., Chemical Abstracts, vol. 90, #40174z (1979).

Primary Examiner—Floyd D. Higel
Attorney, Agent, or Firm—Oblon, Spivak, McClelland, Maier & Neustadt

[57] ABSTRACT

Quaternized condensation products useful as aftertreating agents for fixing reactive dyeings and prints on textile materials which contain cellulose fibers are formed from
A) a precondensate of one or more trialkanolamines I $$N \begin{matrix} R^1-OH \\ -R^2-OH \\ R^3-OH \end{matrix} \qquad I$$

($R^1$–$R^3$ = $C_2$–$C_4$-1,2-alkylene),

B) a) a carboxylic acid or a derivative thereof IIa $$R^4 - \left[ \begin{matrix} O \\ \| \\ C - R^6 \end{matrix} \right]_n - \begin{matrix} O \\ \| \\ C - R^5 \end{matrix} \qquad IIa$$

[n=0, 1; $R^4$, $R^5$=OH (except if n=0), $C_1$–$C_8$-alkoxy (possibly joined together to form a 5- or 6-membered ring if n=0), Cl, Br; $R^6$=$C_1$–$C_{50}$-alkylene (possibly interrupted by one or more nonadjacent oxygen atoms)], b) a carboxamide IIb $$R^7-NH-\left[\begin{matrix}O\\\|\\C + NH \overset{}{\rightarrow}_m R^6 + NH \overset{}{\rightarrow}_m\end{matrix}\right]_n - \begin{matrix}O\\\|\\C + NH \overset{}{\rightarrow}_r R^8\end{matrix} \qquad IIb$$

[m, n, r=0, 1; $R^7$=H, $C_1$–$C_4$-alkyl; $R^8$=H, $C_1$–$C_{25}$-alkyl, $C_2$–$C_{25}$-alkenyl, Ph (possibly substituted by $C_1$–$C_4$-alkyl, $C_1$–$C_4$-alkoxy, F, Cl, Br)], c) an epihalohydrin IIc, $$X-CH_2-CH\overset{O}{\underset{}{\diagup\diagdown}}CH_2 \quad (X = Cl, Br) \qquad IIc$$

d) a monofunctional compound IId $$R^9-Y \qquad IId$$

[$R^9$=$C_1$–$C_{25}$-alkyl, $C_2$–$C_{25}$-alkenyl, Ph (possibly substituted by $C_1$–$C_4$-alkyl, $C_1$–$C_4$-alkoxy, F, Cl, Br); Y=isocyanate, OCONHR$^8$, glycidyloxy], e) a bifunctional compound IIe $$Z^1-R^{10}-Z^2 \qquad IIe$$

[$R^{10}$=$C_a$–$C_{50}$-alkylene (possibly interrupted by one or more nonadjacent oxygen atoms, possibly containing one or more mutually nonvicinal hydroxyl groups); $Z^1$, $Z^2$=Cl, Br, isocyanate, NH—COOR$^9$, glycidyloxy, OR$^9$], and C) a benzyl halide III $$(R^{11})_p\!\!-\!\!\underset{}{\diagdown}\!\!\!\!\diagup\!\!\!CH_2-X \qquad III$$

(p=0–2; $R^{11}$=$C_1$–$C_4$-alkyl, $C_1$–$C_4$-alkoxy, F, Cl, Br).

6 Claims, No Drawings

QUATERNIZED CONDENSATION PRODUCTS OF TRIALKANOLAMINES

The present invention relates to quaternized condensation products of (A) a precondensate of one or more trialkanolamines of the general formula I

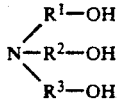   I where $R^1$, $R^2$ and $R^3$ are each 1,2-alkylene of from 2 to 4 carbon atoms, and (B) from 1 to 30 mol % per mole of I of one of the following compounds II:

(a) a carboxylic acid or carboxylic acid derivative of the general formula IIa

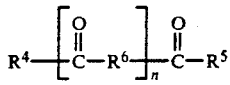   IIa where
n is 0 or 1
$R^4$ and $R^5$ are each hydroxyl except if n is 0, or $C_1$-$C_8$-alkoxy which if n is 0 may be bonded together to form a five- or six-membered ring, or chlorine or bromine, and
$R^6$ is alkylene of from 1 to 50 carbon atoms which may be interrupted by one or more nonadjacent oxygen atoms, (b) a carboxamide of the general formula IIb

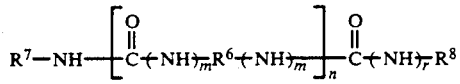   IIb where
m, n, and r are each 0 or 1,
$R^7$ is hydrogen or $C_1$-$C_4$-alkyl and
$R^8$ is hydrogen, $C_1$-$C_{25}$-alkyl, $C_2$-$C_{25}$-alkenyl, or phenyl which may be substituted by $C_1$-$C_4$-alkyl, $C_1$-$C_4$-alkoxy, fluorine, chlorine or bromine, (c) an epihalohydirin of the general formula IIc

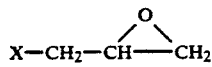   IIc where X is chlorine or bromine, (d) a monofunctional compound of the general formula IId

   IId where
$R^9$ is $C_1$-$C_{25}$-alkyl, $C_2$-$C_{25}$-alkenyl, or phenyl which may be substituted by $C_1$-$C_4$-alkyl, $C_1$-$C_4$-alkoxy, fluorine, chlorine or bromine, and
Y is isocyanate or one of the groups

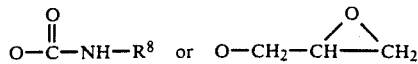

and/or (e) a bifunctional compound of the general formula IIe $$Z^1-R^{10}-Z^2 \quad \text{IIe}$$

where
$R^{10}$ is alkylene of from 1 to 50 carbon atoms which may be interrupted by one or more nonadjacent oxygen atoms and/or contain one or more mutually nonvicinal hydroxyl groups, and
$Z^1$ and $Z^2$ are each chlorine, bromine, isocyanate or one of the groups

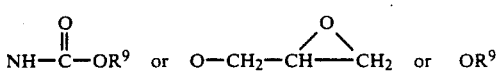

and
(C) from 25 to 100 mol % per mole of I of a benzyl halide of the general formula III

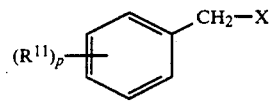   III where
p is from 0 to 2 and
$R^{11}$ is $C_1$-$C_4$-alkyl, $C_1$-$C_4$-alkoxy, fluorine, chlorine or bromine.

The present invention also relates to a process for preparing the quaternized condensation products and to the use thereof as aftertreating agents for fixing dyeings and prints on textile materials which contain cellulose fibers and have been dyed or printed with reactive or direct dyes, and to a process for this aftertreatment.

Textile materials which contain cellulose fibers and have been dyed or printed with reactive or direct dyes are usually subjected to an alkali wash in the presence of surfactants in order to remove the unfixed dye portions. This procedure gives dyed or printed cellulose materials which, it is true, have adequate wash fastness properties but are in need of improvement in respect of the waterfastness, the hot-press fastness and the perspiration fastness.

The aftertreating process described in DE-A-3,526,101 using cationic condensation products obtainable by reaction of piperazine derivatives with bifunctional halogen or epoxy compounds and subsequent quaternization with benzyl chloride leads to substantial elimination of the defects described, but in some cases impairs the crock fastness and in particular the lightfastness.

EP-B-087,147 relates to reaction products of triethanolamine condensates and xylene dichlorides. However, these products are not used in the textile industry, but are used as emulsion breakers, lubricants and paper assistants.

EP-A-223,064 deals with benzyl chloride-quaternized condensation products of triethanolamine and/or triisopropanolamine as aftertreating agents for the fixation of reactive dyeings. These compounds bring about an improvement not only in the wet but also in the crock and lightfastness properties. To obtain the desired application properties, however, trialkanolamine condensates of a high degree of condensation which corresponds to a viscosity of not less than 40,000 mPa.s in the undiluted state in the case of triethanolamine and of not less than 600,000 mPa.s in the undiluted state in the case of triisopropanolamine are required. The preparation of such high-viscosity polyaminoethers is, as explained in EP-B-087,147 highly problematical at just below the gel point because of the difficult-to-control condensation reaction, since the reaction mixture tends to form a solid, insoluble mass here which is no longer handlable for any further reaction.

It is an object of the present invention to provide conveniently preparable aftertreating agents for the purpose mentioned which ensure high wetfastness properties without impairing the crock and lightfastness properties.

We have found that this object is achieved by the quaternized condensation products defined at the beginning.

The precondensates used for preparing the cationic resins according to the invention can be obtained by heating the trialkanolamines I, in particular triethanolamine or triisopropanolamine $N[CH_2-CH(CH_3)-OH]_3$, in the presence of acid catalysts, preferably phosphorous or hypophosphorous acid, at from 120° to 280° C. as described in EP-A-223,064. In a departure from the process of this EP-A, however, the reaction of the process according to the invention is advantageously discontinued by cooling at distinctly below the gel point once a viscosity range from 5,000 to 35,000 mPa.s, preferably from 10,000 to 25,000 mPa.s, for triethanolamine or from 100,000 to 600,000 mPa.s, preferably from 200,000 to 500,000 mPa.s, for triisopropanolamine or from 100,000 to 250,000 mPa.s for a cocondensate of preferably equimolar amounts of triethanolamine and triisopropanolamine has been reached (in each case the viscosity is measured in the undiluted state at 20° C.). To effect further crosslinking and/or to incorporate groups of different polarities at the chains which carry the alcohol functions and/or to quaternize the central nitrogen atoms, the precondensates obtained are reacted with one or more compounds IIa-IIe. The amount of these compounds is within the range from 1 to 30 mol %, preferably from 1 to 15 mol %, per mole of I.

Suitable compounds IIa-IIe are:

(a) the carboxylic acids or carboxylic acid derivatives IIa of the type defined, where $R^4$ and $R^5$ are each hydroxyl, $C_1$-$C_8$-alkoxy, preferably $C_1$-$C_4$-alkoxy, chlorine or bromine and the linkage member $R^6$ is in particular the group

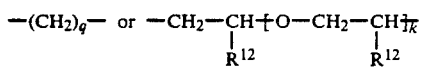

where q is from 1 to 50, preferably from 2 to 10, k is from 0 to 24, preferably from 0 to 12, and $R^{12}$ is hydrogen, methyl or ethyl; preference is further given to unbranched linkage members $R^6$.

Examples of compounds IIa are:

(α) carbonic acid derivatives (n =0), eg. dimethyl carbonate, diethyl carbonate, dipropyl carbonate, dibutyl carbonate, ethylene carbonate, 1,2-propylene carbonate, 1,3-propylene carbonate, 1,2-butylene carbonate, 1,3-butylene carbonate, 2,3-butylene carbonate, phosgene, monomethyl chlorocarbonate or bromocarbonate, monoethyl chlorocarbonate or bromocarbonate. Preference is given to cyclic carbonates, in particular ethylene carbonate and 1,3-propylene carbonate;

(β) dicarboxylic acids (n=1, $R^4=R^5=OH$), eg. malonic acid, succinic acid, glutaric acid, adipic acid, pimelic acid, suberic acid, azelaic acid and sebacic acid;

(γ) dicarboxylic acid derivatives (n=1; $R^4,R^5$=alkoxy, Cl, Br), eg. the dimethyl, diethyl, dipropyl and dibutyl esters and the chlorides and bromides of the dicarboxylic acids mentioned under (β);

(b) the carboxamides IIb of the type defined, examples of which are:

(α) monocarboxamides (n=r=0), eg. formamide, acetamide, propionamide, butyramide, benzamide and the N-methyl, N-ethyl, N-propyl and N-butyl derivatives thereof;

(β) dicarboxamides (m=0, n=r=1), eg. malonamide, succinamide, glutaramide, adipamide, pimelamide, suberamide, azelaamide, sebacamide and N,N'-dimethyl, N,N'-diethyl, N,N'-dipropyl and N,N'-dibutyl derivatives thereof;

(γ) ureas (n=0, r=1), eg. urea, N-methylurea, N-ethylurea, N-propylurea, N-butylurea, N,N'-dimethylurea, N,N'-diethylurea, N,N'-dipropylurea, N,N'-dibutylurea, N-(2-ethylhexyl)urea, N-isononylurea, N-isotridecylurea, N-laurylurea, N-myristylurea, N-palmitylurea, N-stearylurea, N-oleylurea, N-linolylurea, N-linolenylurea and N-phenylurea. Preference is given to monosubstituted ureas and in particular to unsubstituted urea;

(δ) bisureas (m=n=r=1), eg. methylenediurea, ethylene-1,2-diurea, propylene-1,3-diurea, butylene-1,4-diurea, pentamethylene-1,5-diurea, hexamethylene-1,6-diurea, di(2-ureidoethyl) ether, di(3-ureidopropyl) ether, ethylene glycol bis(2-ureidoethyl) ether, ethylene glycol bis(3-ureidopropyl) ether, diethylene glycol bis(2-ureidoethyl) ether, triethylene glycol bis(2-ureidoethyl) ether and tetraethylene glycol bis(2-ureidoethyl) ether. Preference is given to bisureas having an alkylene linkage $R^6$ of from 4 to 10 carbon atoms, particular preference being given to hexamethylene-1,6-diurea;

(c) an epihalohydrin IIc where X is chlorine or bromine. Preference is given to epichlorohydrin;

(d) the monofunctional compounds IId of the type defined, examples of which are:

(α) isocyanates, eg. methyl isocyanate, ethyl isocyanate, propyl isocyanate, butyl isocyanate, 2-ethylhexyl isocyanate, isononyl isocyanate, isotridecyl isocyanate, lauryl isocyanate, myristyl isocyanate, palmityl isocyanate, stearyl isocyanate, oleyl isocyanate, linolyl isocyanate, linolenyl isocyanate, phenyl isocyanate, o-, m- or p-chlorophenyl isocyanate and o-, m- or p-tolyl isocyanate;

(β) urethanes, eg. methyl carbamate, ethyl carbamate, propyl carbamate, butyl carbamate and the N-methyl, N-ethyl, N-propyl and N-butyl derivatives thereof;

(γ) glycidyl ethers, eg. methyl glycidyl ether, ethyl glycidyl ether, propyl glycidyl ether, butyl glycidyl ether, (2-ethylhexyl) glycidyl ether, isononyl glycidyl ether, isodecyl glycidyl ether, isotridecyl glycidyl ether, lauryl glycidyl ether, myristyl glycidyl ether, palmityl glycidyl ether, stearyl glycidyl ether, oleyl glycidyl ether, linolyl glycidyl ether, linolenyl glycidyl ether, cyclohexyl glycidyl ether, glycidyl ethers of $C_{13}$-$C_{15}$ oxoalcohol, $C_{12}$-$C_{14}$ fatty alcohol and $C_{16}$-$C_{18}$ fatty alcohol, and phenyl glycidyl ether;

(e) the bifunctional compounds IIe of the type defined where $R^{10}$ is alkylene of from 1 to 50 carbon atoms, preferably of from 2 to 26 carbon atoms, which may be interrupted by one or more nonadjacent oxygen atoms and/or contain one or more mutually nonvicinal hydroxyl groups. The linkage member $R^{10}$ is in particular the group

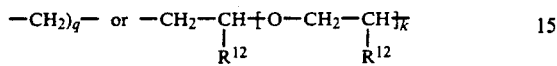

where q is from 1 to 50, preferably from 2 to 10, k is from 0 to 24, preferably from 0 to 12, and $R^{12}$ is hydrogen, methyl or ethyl; preference is further given to unbranched linkage members $R^{10}$.

Examples of compounds IIe are:

(α) dichlorides or dibromides, eg. methylene chloride, 1,2-dichloroethane, 1,3-dichloropropane, 1,4-dichlorobutane, 1,5-dichloropentane, 1,6-dichlorohexane, di[2-chloroethyl] ether, di[3-chloropropyl] ether, ethylene glycol bis[2-chloroethyl] ether, ethylene glycol bis[3-chloropropyl] ether, diethylene glycol bis[2-chloroethyl] ether, triethylene glycol bis[2-chloroethyl] ether, 1,3-dichloro-2-propanol, di[3-chloro-2-hydroxypropyl] ether, ethylene glycol bis[3-chloro-2-hydroxypropyl] ether, diethylene glycol bis[3-chloro-2-hydroxypropyl] ether, triethylene glycol bis[3-chloro-2-hydroxypropyl] ether, neopentylene bis[3-chloro-2-hydroxypropyl] ether or the corresponding bromine compounds;

(β) diisocyanates, eg. ethylene 1,2-diisocyanate, propylene 1,3-diisocyanate, butylene 1,4-diisocyanate, pentamethylene 1,5-diisocyanate, hexamethylene 1,6diisocyanate, di(2-isocyanatoethyl) ether, di(3-isocyanatopropyl) ether, ethylene glycol bis(2-isocyanatoethyl) ether, ethylene glycol bis(3-isocyanatopropyl) triethylene glycol bis(2-isocyanatoethyl) ether and tetraethylene glycol bis(2-isocyanatoethyl) ether;

(γ) bisurethanes, eg. the dimethyl, diethyl, dipropyl and dibutyl esters of ethylene 1,2-dicarbamic acid, propylene-1,3-dicarbamic acid, butylene-1,4-dicarbamic acid, pentamethylene-1,5-dicarbamic acid, hexamethylene-1,6-dicarbamic acid, di[2-(carboxyamino)ethyl] ether, di[3-(carboxyamino)propyl] ether, ethylene glycol bis[2-(carboxyamino)ethyl] ether, ethylene glycol bis[3-(carboxyamino)propyl] ether, diethylene glycol bis[2-(carboxyamino)ethyl] ether, triethylene glycol bis[2-(carboxyamino)ethyl] ether and tetraethylene glycol bis[2-(carboxyamino)ethyl] ether;

(δ) bisglycidyl ethers, eg. ethylene glycol bisglycidyl ether, 1,3-propanediol bisglycidyl ether, 1,4-butanediol bisglycidyl ether, 1,5-pentanediol bisglycidyl ether, 1,6-hexanediol bisglycidyl ether, diethylene glycol bisglycidyl ether, di[3-(glycidyloxy)propyl] ether, triethylene glycol bisglycidyl ether, ethylene glycol bis[3-(glycidyloxy)propyl] ether, tetraethylene glycol bisglycidyl ether, pentaethylene glycol bisglycidyl ether, hexaethylene glycol bisglycidyl ether and neopentylene glycol bisglycidyl ether;

(ε) γ-alkoxy- or γ-aryloxy-propylene halohydrides, eg. 3-chloro-2-hydroxypropyl methyl ether, 3-chloro-2-hydroxypropyl ethyl ether, 3-chloro-2-hydroxypropyl propyl ether, 3-chloro-2-hydroxypropyl butyl ether, 3-chloro-2-hydroxypropyl-2-ethylhexyl ether, 3-chloro-2-hydroxypropyl isononyl ether, 3-chloro-2-hydroxypropyl isotridecyl ether, 3-chloro-2-hydroxypropyl lauryl ether, 3-chloro-2-hydroxypro-pyl myristyl ether, 3-chloro-2-hydroxypropyl palmityl ether, 3-chloro-2-hydroxypropyl stearyl ether, 3-chloro-2-hydroxypropyl oleyl ether, 3-chloro-2-hydroxypropyl linolyl ether, 3-chloro-2-hydroxypropyl linolenyl ether and 3-chloro-2-hydroxypropyl phenyl ether or the corresponding bromine compounds.

The precondensate formed from triethanolamine is preferably reacted with a urea IIb (n=0, r=1), a bisurea IIb (m=n=r=1) or a cyclic carbonate IIa ($R^4$-$R^5$=O-alkylene-O, n=0) at from 100° to 210° C., preferably from 140° to 200° C., without solvent to a viscosity of from 20,000 to 300,000 mPa.s, preferably from 28,000 to 150,000 mPa.s, and with an epihalohydrin IIc without a solvent at from 40° to 150° C., preferably from 60° to 130° C., or in an aqueous or even aqueous-alcoholic solution not less than 40% strength by volume at from 40° to 100° C. to a viscosity at 20° C. of an 80% strength by weight aqueous solution of from 12,000 to 40,000 mPa.s, preferably from 15,000 to 36,000 mPa.s The precondensate formed from triisopropanolamine is preferably reacted with a urea IIb (n=0, r=1), a bisurea IIb (m=n—r—1) or a cyclic carbonate IIa ($R^4$-$R^5$=O-alkylene-O, n=0) at from 100° to 210° C., preferably from 140° to 200° C., without solvent to a viscosity of more than 500,000 mPa.s and with an epihalohydrin IIc without solvent at from 40° to 150° C., preferably from 60° to 130° C., or in an aqueous or even aqueous-alcoholic solution not less than 40% strength by volume at from 40° to 100° C.

The precondensate formed from a mixture of triethanolamine and triisopropanolamine, preferably in a molar ratio of 1:1, is reacted for example with a urea IIb (n=0, r=1), a bisurea IIb (m=n=r=1) or a cyclic carbonate IIa ($R^4$-$R^5$=O-alkylene-O, n=0) at from 100° to 210° C., preferably from 140° to 200° C., without solvent to a viscosity of more than 300,000 mPa.s.

The reaction products of the polyaminoether precondensates and compounds IIa-IIe are then reacted with from 25 to 100 mol %, preferably from 60 to 95 mol %, of one or more of the benzyl halides III of the type defined.

Preference is given to benzyl chlorides which are monosubstituted in the para position (X=Cl, p=1), but particular preference is given to unsubstituted benzyl chloride (X=Cl, p=0).

The benzyl halide reacts chiefly with the central nitrogen atom of the polyaminoether/compound IIa--IIe condensation product, thereby quaternizing said condensation product.

The reaction with the benzyl halide is preferably carried out in aqueous or even aqueous-alcoholic medium at from 60° to 100° C., but can also be carried out at higher temperatures using shorter reaction times, although in this case it will have been necessary to employ superatmospheric pressure. The aqueous or aqueous-alcoholic solution of the quaternized product can be used directly, with or without an addition of diethylene glycol, in the textile sector as provided for by the invention.

The condensation product according to the invention can be used as an aftertreating agent for fixing dyeings and prints on textile materials which contain cellulose fibers and have been dyed or printed with direct or preferably reactive dyes.

The textile materials which contain cellulose fibers can be present in the form of fibers, yarns, fabrics or other piece goods. The cellulose fibers are preferably cotton, linen or staple viscose. The textile materials which can be aftertreated according to the invention can consist of cellulose fibers alone or contain cellulose fibers blended with synthetic fibers such as polyamide, polyacrylonitrile or polyester fibers.

The textile material is dyed or printed with commercial reactive or direct dyes in a conventional manner. For instance, reactive dyes are applied at from 20° to 100° C. by the exhaust method or at room temperature by the cold pad-batch method; after dyeing, the textile material is thoroughly rinsed with water, advantageously first at least once with cold water and then at least once with water at from 70° to 100° C.

The aftertreatment of the dyed or printed cellulose fiber materials wherein the cellulose fibers may be present blended with other types of fibers is preferably effected batchwise or continuously with an aqueous liquor of the quaternized condensation product using a customary technique for applying aftertreating agents. The batchwise aftertreatment of the dyed or printed materials with the aqueous liquor takes in general from 5 to 30 minutes. The concentration of the water-soluble quaternized resin in the aftertreating liquor is preferably from 0.1 to 5.0 g/l, particularly preferably from 0.25 to 2.0 g/l. The liquor ratio (ratio of aqueous liquor in 1 to dry textile material in kg) is within the range from 5:1 to 50:1, preferably from 10:1 to 20:1. The aftertreating liquor preferably has a pH within the range from 4 to 11, particularly preferably from 5 to 8. However, the quaternized resin can also be applied to the textile material which is to be aftertreated by padding. Padding is generally effected with an aqueous solution of quaternized resin in a concentration of from 1.0 to 50 g/l, preferably from 2.5 to 15 g/l.

The aftertreatment according to the invention is customarily carried out within the temperature range from 5° to 100° C., preferably at from 40 to 70° C., by a method similar to the exhaust method. Alternatively, the dyed or printed textile material is first rinsed with cold and hot water, then treated with the aqueous solution of the quaternized resin, almost to boiling point within the range from 70° to 100° C., and subsequently rinsed with water. After the aftertreatment according to the invention the textile material which contains cellulose fibers can be rinsed. It is then dried.

The aftertreating process with the quaternized condensation product prepared according to the invention leads to the dyeings and prints obtained having high wetfastness properties. Excellent results are obtained in particular in the severe waterfastness test, for the perspiration fastness and for the hot/moist test. The light fastness properties are not impaired compared with a dyeing which has not been aftertreated according to the invention, in contradistinction from conventional aftertreating agents which frequently cause the lightfastness properties to deteriorate. Nor are the crock fastness properties impaired by the aftertreating process according to the invention; in some cases they are even somewhat improved.

Further advantages of the aftertreating process according to the invention are the nonappearance of precipitates which frequently result when assistants come together with hydrolyzed reactive dye portions washed out of the textile material, and the nonbrightening of dyeings or prints, so that there are no shade changes even in the case of combination shade dyeings.

EXAMPLES

The percentages used in the Synthesis and Use Examples are by weight, unless otherwise stated. The viscosities were measured at 20° C. in a rotary viscometer (Haake, Rotavisco).

SYNTHESIS EXAMPLES

Synthesis Example 1

1788 g of triethanolamine and 12 g of hypophosphorous acid (50% strength aqueous solution) were heated with stirring to 225°-230° C. while a slow stream of nitrogen was passed through the mixture. The water formed in the course of the reaction was distilled off. After 7-8 hours, the condensation was discontinued at a viscosity of 21,000 mPa.s by cooling to room temperature, affording 1492 g of triethanolamine condensate (amine number: 7.69 mmol/g).

130 g of this triethanolamine polyether were heated together with 3.0 g of urea (corresponding to 5 mol %) with stirring to 170°-180° C. under nitrogen, and the mixture was maintained at that temperature for 6 hours until the evolution of ammonia had ceased. The urethane thus obtained (viscosity 41,000-45,000 mPa.s) was diluted with 100 g of water and heated to 70° C. 101 g of benzyl chloride (corresponding to 80 mol %) were then added dropwise in the course of 2 hours. The mixture was then stirred at 80° C. for 3 hours and adjusted with 133 g of water to a 50% level in respect of cationic compound.

The method of Synthesis Example 1 was also used to prepare the quaternized compounds listed in Table 1.

TABLE 1

| | Quaternized condensation products with urea | | | |
|---|---|---|---|---|
| | Triethanol-amine pre- | Reaction with urea | | |
| Synthesis Example No. | condensate viscosity [mPa.s] | mol % | viscosity [mPa.s] | Quaternizing agent (mol %) |
| 2 | 25,000 | 5 | 65,400 | Benzyl chloride (80) |
| 3 | 10,000 | 10 | 35,000 | Benzyl chloride (80) |
| 4 | 10,000 | 15 | 65,000 | Benzyl chloride (80) |
| 5 | 20,000 | 5 | 39,000 | Benzyl chloride (90) |
| 6 | 21,000 | 5 | 42,000 | 4-Chlorobenzyl chloride (80) |
| 7 | 21,000 | 5 | 42,000 | 4-Methylbenzyl chloride (80) |

Synthesis Example 8

260 g of a triethanolamine precondensate (amine number: 7.69 mmol/g) of viscosity 19,900, prepared as in Synthesis Example 1, and 10.1 g of hexamethylene-1,6-diurea (corresponding to 2.5 mol %) were stirred under nitrogen at 160° C. for 2 hours and then at 180° C. for hours until the evolution of ammonia had ceased.

The viscosity of the resulting mixture was 63,000 mPa.s. After dilution with 200 g of water, 203 g of benzyl chloride (corresponding to 80 mol %) were added dropwise at 60°–70° C. in the course of 2 hours. The mixture was then stirred at 80° C. for 3 hours and diluted with 268 g of water.

Synthesis Example 9

131.2 g of a triethanolamine precondensate (amine number: 7.62 mmol/g) of viscosity 20,400 mPa.s, prepared as in Synthesis Example 1, and 36.3 g of isotridecylurea (corresponding to 15 mol %) were stirred under nitrogen at 165° C. for 1.5 hours and then at 180° C. for 5 hours until the evolution of ammonia had ceased. The viscosity of the reaction product was 34,800 mPa.s. After dilution with 100 g of water, 101 g of benzyl chloride (corresponding to 80 mol %) were added dropwise at 70° C. in the course of 1.5 hours. After three hours' stirring at 85° C., 158 g of diethylene glycol were added to prepare a clear solution.

Synthesis Example 10

670.5 g of triethanolamine and 860.7 g of triisopropanolamine (in each case 4.5 mol) were stirred together with 9.0 g of hypophosphorous acid (50% strength aqueous solution) at 220° C. while a slow stream of nitrogen was passed through the mixture. The water formed in the course of the reaction was distilled off. After 7-8 hours the condensation was discontinued at a viscosity of 174,600 mPa.s by cooling to room temperature, affording 1332 g of cocondensate (amine number: 6.46 mmol/g).

309.6 g of this cocondensate were heated together with 6.0 g of urea (corresponding to 5 mol %) with stirring to 170°–180° C. under nitrogen and maintained at that temperature for 5 hours until the evolution of ammonia had ceased. The reaction product (viscosity 383,000 mPa.s) was diluted with 200 g of water and heated to 70° C. 203 g of benzyl chloride (corresponding to 80 mol %) were then added dropwise in the course of 2 hours. The mixture was then stirred at 100° C. for 5 hours and 318 g of diethylene glycol were added to prepare a clear solution.

Synthesis Example 11

1530 g of triisopropanolamine and 8.0 g of hypophosphorous acid (50% strength aqueous solution) were heated with stirring to 200°–225° C. as described in Synthesis Examples 1 and 10 while a slow stream of nitrogen was passed through the mixture. The water formed in the course of the reaction was distilled off. The condensation was discontinued at a viscosity of 390,000 mPa.s by cooling to room temperature.

359.6 g of this triisopropanolamine precondensate (amine number: 5.56 mmol/g) were heated with 6.0 g of urea (corresponding to 5 mol %) with stirring to 170°–180° C. under nitrogen and maintained at that temperature for 5 hours until the evolution of ammonia had ceased. On cooling to room temperature, the reaction product became solid. It was dissolved in a mixture of 210 g of water and 85 g of isobutanol at 70° C. and admixed at that temperature with 208 g of benzyl chloride (corresponding to 82 mol %) in the course of 2 hours. It was then refluxed for 13 hours. The isobutanol was then distilled off, and a sufficient amount of water was added by weight to replace the distillate. 270 g of diethylene glycol were added to prepare a clear solution.

Synthesis Example 12

A mixture of 128.4 g of a triethanolamine precondensate (amine number: 7.79 mmol/g) of viscosity 15,000 mPa.s, prepared as in Synthesis Example 1, and 32 g of water (viscosity of the resulting mixture 2800 mPa.s) was admixed with 5.6 g of epichlorohydrin (corresponding to 6 mol %) added dropwise. The solution was heated to 70° C. The pH was maintained at 9 by the addition of a total of 5.0 g of concentrated hydrochloric acid. The viscosity of the solution rose from 15,000 to 16,000 mPa.s in the course of 8 hours. After addition of 76.8 g of water, 76 g of benzyl chloride (corresponding to 60 mol %) were added dropwise at 70° C. The mixture was stirred at 80° C. for 3 hours and diluted with 100 g of water.

The method of Synthesis Example 12 was also used to prepare the quaternized compounds listed in Table 2.

TABLE 2

| Quaternized condensation products with epichlorohydrin | | | | |
|---|---|---|---|---|
| | Triethanolamine precondensate | Reaction with epichlorohydrin | | |
| Synthesis Example No. | viscosity undiluted [mPa.s] | mol % | viscosity diluted [mPa.s] | Quaternizing agent (mol %) |
| 13 | 10,000 | 10 | 17,900 | Benzyl chloride (75) |
| 14 | 20,000 | 5 | 35,700 | Benzyl chloride (75) |
| 15 | 33,000 | 1.9 | 16,000 | Benzyl chloride (75) |
| 16 | 20,400 | 3.4 | 15,400 | 4-Methoxybenzyl chloride (70) |

Synthesis Example 17

129.5 g of a triethanolamine precondensate (amine number: 7.72 mmol/g) of viscosity 23,500 mPa.s, prepared as in Synthesis Example 1, and 4.6 g of epichlorohydrin (corresponding to 5 mol %) were heated to 100°–105° C. and stirred at that temperature for 5 hours. The viscosity of the melt after it had cooled down to 20° C. was 65,400 mPa.s. After 80 g of water had been added, the mixture was reacted at from 70° to 80° C. with 85.3 g of benzyl chloride (corresponding to 67 mol %).

Synthesis Example 18

129.5 g of a triethanolamine precondensate (amine number: 7.72 mmol/g) of viscosity 23,600 mPa.s, prepared as in Synthesis Example 1, and 5.1 g of 1,3-propylene carbonate (corresponding to 5 mol %) were stirred at 150° C. for 2.5 hours and then at 180° C. for 2.5 hours while a slow stream of nitrogen was passed through the mixture. The viscosity was then 28,300–29,500 mPa.s. After the addition of 80 g of water, 91 g of benzyl chloride (corresponding to 72 mol %) were slowly added dropwise at 70° C. The mixture was then stirred at 80° C. for 3 hours.

The preparation of a quaternized condensation product with ethylene carbonate can take place in the same way as the reaction with 1,3-propylene carbonate.

USE EXAMPLES

The suitability of the quaternized condensation products according to the invention as aftertreating agents was tested on bleached, mercerized and reactive-dyed cotton cloth.

General dyeing method I (for reactive dyes of medium reactivity): the cotton material was introduced at 25° C. and a liquor ratio of 10:1 into a dyebath containing the dyes mentioned in the Use Examples in commercial form, 60 g/l of sodium sulfate, 2.0 ml/l of 38° Be sodium hydroxide solution and 5.0 g/l of sodium carbonate and 1.0 g/l of sodium m-nitrobenzenesulfonate to prevent undesirable reduction of the dye. Following a dwell period of 15 minutes at 25° C., the bath was heated to 80° C. in the course of 30 minutes and kept at that temperature for 60 minutes. After dyeing, the material was rinsed with cold water in a liquor ratio of 20:1 for 10 minutes, the rinse liquor was dropped, and the material was then treated with water at 98° C. for 10 minutes.

General dyeing method II (for reactive dyes of high reactivity): the cotton material was introduced at 15°–17° C. and a liquor ratio of 10:1 into a dyebath containing the dyes mentioned in the Use Examples in commercial form, 60 g/l of sodium sulfate and 15 g/l of sodium carbonate. Following a dwell period of 10 minutes, the bath was heated to 30° C. in the course of 15 minutes and kept at that temperature for 60 minutes. After dyeing, the cloth was rinsed cold and hot as in general dyeing method I.

The following tests were used to assess the fastness properties of the dyeings:
lightfastness following Xenotest irradiation (DIN 54 004)
alkaline and acid perspiration fastness (DIN 54 020)
dry and wet crock fastness (DIN 54 021)
severe waterfastness test (DIN 54 006)
hot/moist test (storage in saturated steam at 80° C. for 72 hours).

In the hot/moist or hot-press test, the dyed material, after it has been stored in saturated steam, is placed between two white cotton fabrics; this sandwich is thoroughly wetted with water and then hot-pressed twice at 180° C. in a hot-press machine for 30 seconds each time and dried in the machine. As a result of this treatment, the unfixed dyes or the dyes which have been hydrolyzed by the thermal treatment migrate from the dyed to the white material. The hot/moist test simulates six months, storage of the reactive dyeings at room temperature. This test method is very sensitive and tougher than the severe waterfastness test of DIN 54 006. The assessment ranges from 0 to 10, a rating of 10 being best.

Use Example 1

Bleached and mercerized cotton cloth was dyed with 0.8% of the dye C.I. Reactive Blue 41 by method I. It was then treated for 15 minutes at 50° C. with an aqueous solution containing, based on the dry textile material, 1.0% of the quaternized resin of Synthesis Example 2. The pH of the liquor was 7.6. The result obtained was a dyeing whose lightfastness was not impaired compared with a dyeing which had been soaped off in a conventional manner, ie. without aftertreating agent. The hot/moist test rating was 10.

Use Example 2

A dyeing was prepared with 10% of the dye C.I. Reactive Blue 41 and then aftertreated, both steps being carried out as described in Use Example 1. The severe water fastness rating was 5, compared with the 3–4 of a dyeing without aftertreatment. The crock fastness properties were not impaired compared with a dyeing without aftertreatment.

Use Example 3

Two cotton dyeings by method I with 0.25% and 1.6% of the dye C.I. Reactive Brown 32 were aftertreated as described in Use Example 1. For comparison, two dyeings were also aftertreated with a commercial polycationic fixing agent. The lightfastness of the lighter dyeing was 4, that of the darker dyeing 5; the comparative dyeings were each lower by 1.5. The hot/moist test rating was 10 in each case; the ratings for the comparative dyeings were 10 for the lighter dyeing and 8 for the darker dyeing.

Use Example 4

The bleached and mercerized cotton material was dyed with 2.1% of the dye C.I. Reactive Red 204 by method I. It was then aftertreated for 15 minutes at 40° C. with an aqueous solution which, based on the dry textile material, contained 1.0% of the resin of Synthesis Example 14. The pH of the aftertreating liquor was 7.7. The aftertreated dyeing gave a severe waterfastness test rating of 5 and a hot/moist test rating of 9–10. A comparative dyeing which had not been aftertreated had a severe waterfastness test rating of 3–4 and a hot/moist test rating of 4–5.

Use Example 5

The bleached and mercerized cotton material was dyed with 5.0% of the dye C.I. Reactive Red 120 by method I and was aftertreated by the method of Use Example 4 with the quaternized resin of Synthesis Example 18. The severe waterfastness test rating was 5 compared with the 3 of the same dyeing without aftertreatment. The hot/moist test rating was 9–10 compared with 4 without aftertreatment.

Use Example 6

A dyeing was prepared with 1.8% of the dye C.I. Reactive Red 120 which was then aftertreated with the quaternized resin of Synthesis Example 18, both steps being carried out as described in Use Example 5. The wet crock fastness test rating was 2–3, the rating for the untreated dyeing being 2.

Use Example 7

Bleached and mercerized cotton cloth was dyed with 5.0% of the dye C.I. Reactive Blue 168 by method II and then aftertreated for 15 minutes at 60° C. with an aqueous solution which, based on the dry textile material, contained 1.0% of the quaternized resin of Synthesis Example 13. The pH of the aftertreating liquor was 7.1. The dyeing thus aftertreated scored 9–10 in the hot/moist test, while the corresponding dyeing which had not been aftertreated scored 1–2.

Use Example 9

The bleached and mercerized cotton fabric was dyed with 1.8% of the dye Reactive Red 2 by method II and then aftertreated for 15 minutes at 40° C. with an aqueous solution which, based on the dry textile material, contained 1.0% of the quaternized resin of Synthesis Example 7. The result obtained was a dyeing which scored 5 on the severe waterfastness test; the same dyeing without aftertreatment scored 4. The hot/moist test rating was 9–10, compared with 7 for the dyeing without aftertreatment. The wet crock fastness test rating was 2–3 compared with 2 for the dyeing which had not been aftertreated.

Use Example 9

Bleached and mercerized cotton cloth was dyed with 5.0% of the dye Reactive Blue 168 by method II and then aftertreated for 10 minutes at 50° C. with an aqueous solution which, based on the dry textile material, contained 1.0% of the quaternized resin of Synthesis Example 15. The aftertreated dyeing scored 5 in both the severe waterfastness test and the perspiration fastness test. The hot/moist test rating was 9–10. The same dyeing without aftertreatment scored 3 in the hot/moist test and 3–4 each for the severe waterfastness and the perspiration fastness.

Use Example 10

Bleached and mercerized cotton cloth was dyed with 1.8% of the dye C.I. Reactive Red 120 by method I and was aftertreated by the method of Use Example 7 with the quaternized resin of Synthesis Example 8. A dyeing which had not been aftertreated served as a comparison. The alkaline perspiration fastness was 4–5 compared with 3–4 for the comparative dyeing. The wet crock fastness was 2–3, compared with 2 for the comparative dyeing.

Use Example 11

Bleached and mercerized cotton cloth was dyed with 0.7% and 4.0% of the dye C.I. Reactive Yellow 22 by method II and was then aftertreated for 10 minutes at 50° C. with an aqueous solution which, based on the dry textile material, contained 1.0% of the quaternized resin of Synthesis Example 8 (a). The fastness values were compared with those of corresponding dyeings which had not been aftertreated (b) and dyeings which had been aftertreated with a commercial polycationic fixing agent (c). The lightfastness test and hot/moist test ratings are shown in the following table:

| Ratings for | Sample (a) | Sample (b) | Sample (c) |
| --- | --- | --- | --- |
| 0.7% of dye Lightfastness | 5–6 | 6 | 4–5 |
| Hot/moist test | 10 | 7 | 9–10 |
| 4.0% of dye Lightfastness | 6–7 | 7 | 6 |
| Hot/moist test | 10 | 6 | 9 |

We claim:
1. A quaternized condensation product of:
a high viscosity precondensate of one or more trialkanolamines of the formula I

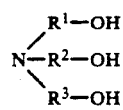

where $R^1$, $R^2$ and $R^3$ are each 1,2-alkylene of from 2 to 4 carbon atoms, and
(B) from 1 to 30 mol % per mole of I of one of the following compounds II.
(a) a carboxylic acid or carboxylic acid derivative of the general formula IIa

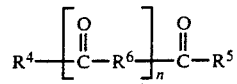

where
n is 0 or 1
$R^4$ and $R^5$ are each hydroxyl except if n is 0, or $C_1$–$C_8$-alkoxy which if n is 0 is open-chained or bonded together to form a five- or six-membered ring, or chlorine or bromine, and
$R^6$ is alkylene of from 1 to 50 carbon atoms which is either uninterrupted or interrupted by one or more nonadjacent oxygen atoms,
(b) a carboxamide of the formula IIb

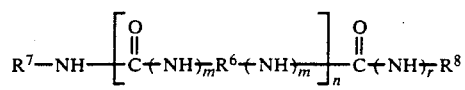

where
m, n, and r are each 0 or 1,
$R^7$ is hydrogen or $C_1$–$C_4$-alkyl and
$R^8$ is hydrogen, $C_1$–$C_{25}$-alkyl, $C_2$–$C_{25}$-alkenyl, or phenyl which is unsubstituted or substituted by $C_1$–$C_4$-alkyl, $C_1$–$C_4$-alkoxy, fluorine, chlorine or bromine,
(c) an epihalohydrin of the formula IIc

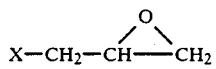

where X is chlorine or bromine,
(d) a monofunctioal compound of the formula IId

where
$R^9$ is $C_1$–$C_{25}$-alkyl, $C_2$–$C_{25}$-alkenyl, or phenyl which is unsubstituted or substituted by $C_1$–$C_4$-alkyl, $C_1$–$C_4$-alkoxy, fluorine, chlorine or bromine, and
Y is isocyanate or one of the groups

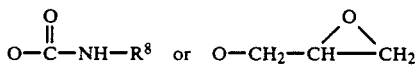

or
(e) a bifunctional compound of the formula IIe

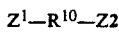

where
$R^{10}$ is alkylene of from 1 to 50 carbon atoms which is uninterrupted or interrupted by one or more nonadjacent oxygen atoms and which is unsubstituted or substituted by one or more mutually nonvicinal hydroxyl groups, and
$Z^1$ and $Z^2$ are each chlorine, bromine, isocyanate or one of the groups

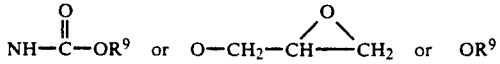

or mixtures thereof, and (c) from 25 to 100 mol % per mole of I of a benzyl halide of the formula III

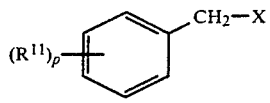

where p is from 0 to 2 and $R^{11}$ is $C_1$-$C_4$-alkyl, $C_1$-$C_4$-alkoxy, fluorine, chlorine or bromine.

2. A quaternized condensation product as claimed in claim 1, wherein $R^1$, $R^2$ and $R^3$ of the trialkanolamine I used are identical and are each 1,2-ethylene or 1,2-propylene.

3. A quaternized condensation product as claimed in claim 1, wherein the viscosity of the precondensate used is within the range from 5000 to 35,000 mPa.s in the case of $R^1=R^2=R^3=$ethylene.

4. A quaternized condensation product as claimed in claim 1, wherein the viscosity of the precondensate used is within the range from 100,000 to 600,000 mPa.s in the case of $R^1=R^2=R^3=$1,2-propylene.

5. A quaternized condensation product as claimed in claim 1, wherein compound II is one of the following substances:

| | |
|---|---|
| urea | (II b, $R^7 = R^8 = H$, n = 0, r = 1) |
| hexamethylene-1, 6-diurea | (II b, $R^6 = (CH_2)_6$, $R^7 = R^8 = H$, m = n = r = 1) |
| epichlorohydrin | (II c, X = Cl) |
| ethylene carbonate | (II a, $R^4 - R^5 = O—CH_2CH_2—O$, n = 0). |
| 1,3-propylene carbonate | (II a, $R^4 - R^5 = O—CH_2CH_2CH_2—O$, n = 0). |

6. A quaternized condensation product as claimed in claim 1, wherein compound III is benzyl chloride (X=Cl, p=0).

* * * * *